United States Patent [19]
Lewis

[11] 3,841,654
[45] Oct. 15, 1974

[54] VEHICLE SAFETY SYSTEM

[75] Inventor: Donald J. Lewis, Troy, Mich.

[73] Assignee: Allied Chemical Corporation, New York, N.Y.

[22] Filed: Sept. 21, 1972

[21] Appl. No.: 290,917

[52] U.S. Cl........... 280/150 AB, 9/314, 280/150 SB
[51] Int. Cl............................................. B60r 21/08
[58] Field of Search .... 280/150 SB, 150 AB; 9/316; 297/386

[56] References Cited
UNITED STATES PATENTS

| | | | |
|---|---|---|---|
| 1,173,482 | 2/1916 | Carlson | 9/316 |
| 1,657,467 | 1/1928 | Gates | 9/340 |
| 2,202,415 | 5/1940 | Christopher et al. | 9/316 |
| 2,703,891 | 3/1955 | Mayer | 9/316 |
| 3,302,973 | 2/1967 | Ravau | 297/386 |
| 3,317,243 | 5/1967 | Weman | 280/150 SB |
| 3,430,979 | 3/1969 | Terry et al. | 280/150 AB |
| 3,682,498 | 8/1972 | Rutzki | 280/150 AB |
| 3,706,462 | 12/1972 | Lilly | 280/150 AB |
| 3,706,463 | 12/1972 | Lipkin | 280/150 AB |
| 3,730,551 | 5/1973 | Sack et al. | 280/150 AB |

FOREIGN PATENTS OR APPLICATIONS

| | | | |
|---|---|---|---|
| 1,902,793 | 8/1970 | Germany | 280/150 AB |
| 531,962 | 1/1941 | Great Britain | 9/316 |

Primary Examiner—David Schonberg
Assistant Examiner—John P. Silverstrim
Attorney, Agent, or Firm—Roger H. Criss; Jonathan Plaut

[57] ABSTRACT

A vehicle safety system is provided which comprises a seat belt having an inflatable section which is normally maintained in an uninflated state and adapted to be positioned about a wearer when the wearer is seated in a seat within the vehicle, sensing means actuatable in response to the occurrence of a preselected condition of the vehicle, and inflating means responsive to actuation of the sensing means and capable of inflating the inflatable section prior to any substantial forward motion of the seat belt wearer relative to his seat as a result of the preselected condition.

16 Claims, 6 Drawing Figures

PATENTED OCT 15 1974　3,841,654

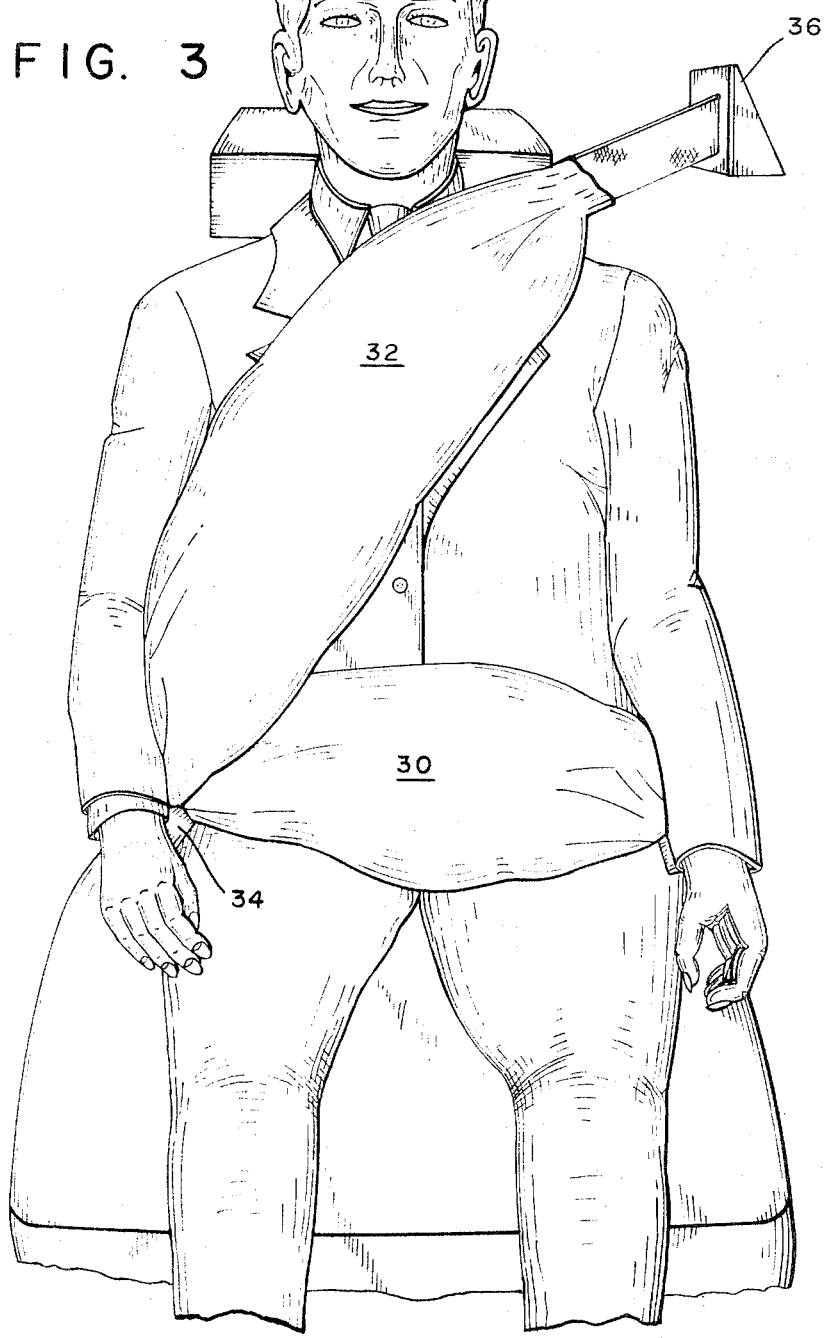

VEHICLE SAFETY SYSTEM

FIELD OF THE INVENTION

This invention relates to safety devices for vehicle occupants, more particularly to seat belt safety devices.

DESCRIPTION OF THE PRIOR ART

Seat belt devices to secure vehicular occupants in their seats in general use today usually include two sections of seat belt webbing, each of which has one end mounted to the vehicle with the other ends attached to a buckle and a cooperating tongue. Such seat belts are designed to restrain an occupant in his seat during a collision by limiting the forward motion of the occupant with respect to his seat as a result of the collision. That is, the wearer moves forward and impacts against the seat belt webbing which thereafter restrains him against further forward motion.

Safety devices of the air bag type have been proposed in which an inflatable air bag is mounted in the interior of the vehicle and is inflated in response to a sensing device which is actuated by a collision of the vehicle. Air bags are designed to prevent the occupant from striking the vehicle structure and operate by cushioning the forward motion of the occupant during a collision.

It has been proposed to combine the two types of safety devices mentioned above by, for example, locating the air bag on the seat belt as is shown in U.S. Pat. No. 3,430,979 to Terry et al. In such a device, the air bags are inflated in response to a signal from a crash sensor, with the bags operating to cushion the forward movement of the occupant as they would if they were mounted on the vehicle itself.

Another combination of air bags and seat belts is shown in U.S. Pat. No. 3,682,498 to Rutzki in which a seat belt is formed of tubular webbing and has an inflatable device (such as an air bag) attached thereto. In a collision, the tubular seat belt and the air bag are inflated by a sufficient force of the wearer acting against the seat belt which breaks frangible seals between a gas source and the seat belt and between the seat belt and the air bag. That is, such a device is designed to be responsive to the forward motion of the wearer as a result of collision forces.

SUMMARY OF THE INVENTION

In accordance with this invention, a vehicle safety system is provided which comprises a seat belt having an inflatable section which is normally maintained in an uninflated state and adapted to be positioned about a wearer when the wearer is seated in a seat within the vehicle, sensing means actuatable in response to the occurrence of a preselected condition of the vehicle, and inflating means responsive to actuation of the sensing means and capable of inflating the inflatable section prior to any substantial forward motion of the seat belt wearer relative to his seat as a result of the preselected condition.

More particularly, a vehicle safety system of the seat belt type is provided in which the seat belt itself is inflatable and by itself restrains the wearer in his seat. In addition, the seat belt is inflatable by suitable means before substantial forward motion of the wearer with respect to his seat due to collision forces or other preselected conditions of the vehicle. As a result, the wearer is restrained in his seat by means of the expanded seat belt when the collision forces act on him to move him forward and the force resulting from such forward motion is absorbed by the inflated seat belt. The inflated seat belt restrains the wearer and since it is already pressed against him before he is forced forward, any significant impact of the wearer into the seat belt is prevented along with any resultant injury therefrom. In this manner, it is possible to utilize the crush-absorbing characteristics of the vehicle itself to decelerate the wearer safely.

Moreover, in the event that the seat belt for some reason fails to inflate, the safety device will serve to operate as a conventional seat belt and thus limit forward motion of the wearer.

BRIEF DESCRIPTION OF THE DRAWING

FIG. 3 is a perspective view of the inflatable seat belts of this invention fastened about an occupant of a vehicle.

DESCRIPTION OF THE PREFERRED EMBODIMENT

Figure 1:
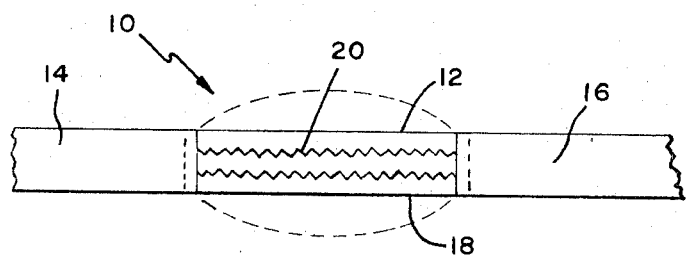
FIG. 1 is a plan view of one embodiment of an inflatable seat belt of this invention.
Figure 2:
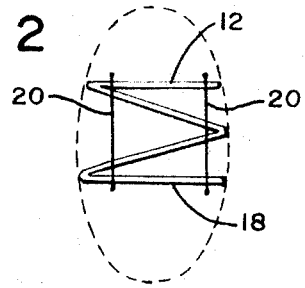
FIG. 2 is a cross-sectional view of the seat belt of FIG. 1.
Figure 5:
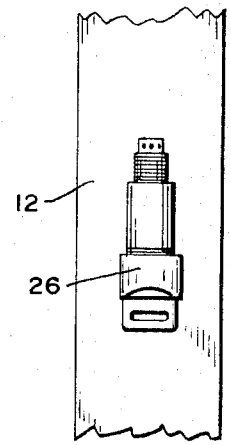
FIG. 5 is a sectional view of an inflatable seat belt with an interiorly located inflating means.
Figure 4:
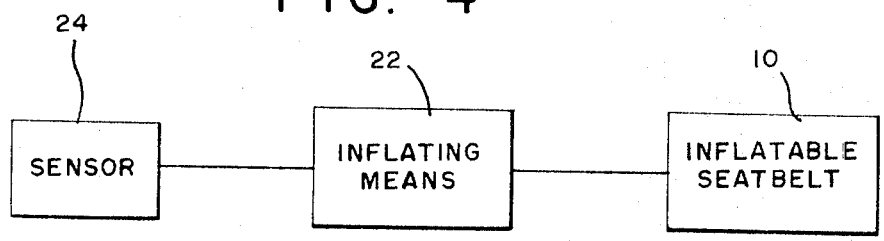
FIG. 4 is a block diagram depicting the system of this invention.

In accordance with a preferred embodiment of this invention, a safety device is provided for vehicle occupants which comprises a hollow inflatable seat belt which is adapted to be inflated prior to any substantial forward motion of the wearer with respect to his seat as a result of a collision of the vehicle or other predetermined condition which is sensed by a sensing means.

The term "vehicle" as used herein refers to land vehicles, such as automobiles, etc., as well as aircraft and the like.

More particularly, and with reference to the drawing wherein the same reference numerals refer to the same or like parts, an inflatable seat belt 10 includes an inflatable section 12 and connecting sections 14 and 16. Inflatable section 12 is preferably formed from a generally tubular sleeve of seat belt material 18 and is normally maintained in the form of an uninflated hollow tube.

Inflatable section 12 is folded, rolled or otherwise normally maintained in its uninflated condition. Preferably, the tubular belt is folded to provide a seemingly flat (that is, generally two-dimensional) seat belt section and the folds are maintained in the tube by suitable fastening means. Suitable fastening means may include, for example, stitches, clips and the like. The uninflated condition is preferably maintained by stitches 20 which extend along the longitudinal direction of inflatable section 12. Stitches 20 are frangible so as to separate or break in response to the inflation of the seat belt section 12 as is more particularly described below. Although two longitudinal rows of stitches are shown in the drawing, it is of course understood that other arrangements of stitches can be employed.

Seat belt webbing 18 is preferably formed of conventional seat belt material, such as a textile which is woven, knitted or otherwise formed from nylon, polyester or other conventional filaments. Webbing 18 preferably is a woven fabric comprised of high strength filaments, such as nylon or polyester, woven to provide a substantially right angle weave pattern, although bias patterns may also be used.

Inflatable seat belt section 12 is preferably formed from a section of textile fabric of a tubular configuration which is cut to the desired length to provide a unitary structure having continuous inner and outer walls. Alternatively, the belt may be formed from a plurality of flat lengths of seat belt material which are connected to each other along their longitudinal edges directly by means of stitching, slips, adhesive or other fastening means or indirectly by means of an intermediate strip of material, suitably attached to each flat fabric by similar fastening means. However, a unitary section of tubular fabric is preferred because of its high strength.

Although it is preferred to form webbing 18 from a tube of fabric, it may alternatively be formed from high strength plastic or rubber materials by such processes as extrusion, etc. For example, webbing 18 may be formed from tubular stock of nylon, polyester, polyethylene, polypropylene or other plastics or rubber.

It is desired that webbing 18 be substantially non-porous, that is, gas impermeable, so that inflatable section 12 when inflated with a gas retains its inflated state by substantially preventing escape of the gas. For this purpose, webbing 18 is preferably woven tightly and is coated or otherwise provided with a non-porous coating. Any conventional non-porous coating composition may be utilized for this purpose, such as polyurethanes, rubbers, etc. and the quantities utilized depend upon the type of fabric to be coated, the coating composition, as well as other factors which are apparent to those skilled in the art. In certain instances, it may be desired to provide webbing 18 with a desired degree of porosity, such as by eliminating the impervious coating or providing apertures in the webbing.

Inflatable section 12 is preferably folded with the folds extending along the longitudinal direction of section 12 (shown by the arrow in the drawing) and it is retained in its folded condition by means of stitching. Section 12 may be longitudinally folded in a "W" shape, "N" shape or other shape and when expanded provides an inflated structure of a generally tubular or cylindrical configuration. The folds allow inflatable section 12 to expand upon inflation to a diameter (or effective diameter, that is, the largest radial dimension of the inflated tube) which is several times the width of the belt in its unfolded condition. This provides a means of providing an enlarged area which is capable of restraining the wearer in case of a collision, etc. For example, with inflatable belt section 12 folded in a "W" shaped fold and having an uninflated width in the order of about 2 inches, the tube in its inflated state may have a diameter or effective diameter of about 6–9 inches or more.

Inflatable section 12 is shown as being connected to connecting sections 14 and 16. Sections 14 and 16 may be secured to inflatable section 12 by means of stitching, adhesive, etc. Sections 14 and 16 are preferably formed of conventional textile seat belt webbing material (e.g., nylon fabric). The ends of sections 14 and 16 which are not connected to inflatable section 12 are designed to be connected to conventional seat belt parts. That is, section 14 for example may be attached to a tongue portion of a conventional seat belt buckle assembly and adapted to be lockably engaged with a buckle portion thereof which is mounted to the floor or other structural part of the vehicle. Section 16 may be connected to a seat belt retractor which permits protraction and retraction of seat belt webbing 18. Inasmuch as seat belt buckles and retractors are well known in the art and may be of a variety of designs, they are not specifically described herein. Of course, retractors need not be employed if so desired and the seat belt can also be fastened about the wearer by any desired fastening means.

In an alternate embodiment, connecting sections 14 and 16 may be dispensed with in which case inflatable section 12 may be connected at one end to a buckle latch and at the other end to a retractor. In this case, inflatable section 12 comprises the entire seat belt section. Accordingly, the term "inflatable section" as employed in the claims is intended to refer to a portion of the seat belt section which is inflatable as well as an entire seat belt which is inflatable. Alternatively, only one connecting section may be provided at either end of the inflatable section.

Although the connecting section or the inflatable section has been described as being secured to the tongue portion of a buckle assembly, they of course could be connected to the buckle portion thereof and adapted to be secured to a cooperating tongue portion. It is preferred to provide at least one connecting section which links inflatable section 12 with a retractor since the flat connecting section is more easily rolled up and stored in a retractor.

The collapsed inflatable seat belt 10 as described above is preferably utilized both in a lap belt section and a shoulder belt section of a seat belt system for an occupant of a vehicle. That is, inflatable sections are preferred to be included in both the lap and shoulder sections of a seat belt system. As shown in the drawing, lap section 30 and shoulder section 32 may comprise separate seat belt sections. More preferably, separate inflatable lap and shoulder sections are provided for a three point seat belt system in which the lap and shoulder sections are attached to a single structure (e.g., tongue portion) which is adapted to be connected to a single buckle. However, if desired a single continuous inflatable seat belt may be provided which is adapted to fit over both the lap and shoulder portions of the wearer. When separate lap and shoulder sections are provided, they may be inflated as a single unit or separately by the same or different inflating means. Of course, if desired, an inflatable seat belt section may be provided in a lap or shoulder section only and furthermore only one such inflatable section (lap or shoulder) may be utilized.

Figure 6:
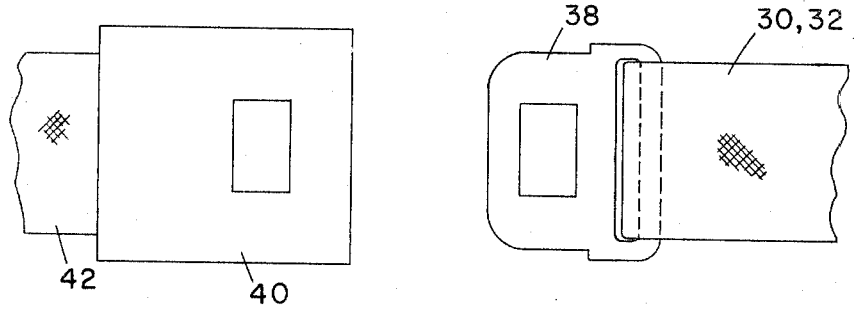
FIG. 6 is a plan view of means to secure the inflatable seat belts to a vehicle.

As shown in FIG. 3, lap section 30 may be connected at one end to a retractor 34 and at the other end to the floor of the vehicle by means of a latch and buckle, not shown. Shoulder section 32 may be connected at one end to retractor 36 (which may be mounted on the ceiling or side of the vehicle) and at the other end to the floor of the vehicle, as shown, or to some portion of the seat itself. As shown in FIG. 6, lap section 30 and shoulder section 32 may be connected to a conventional tongue 38 which is adapted to lockably cooperate with a conventional buckle 40. Buckle 40 is secured to the vehicle via belt 42 or the like. In this manner, the lap and shoulder sections may be secured to the vehicle.

The inflating means is selected to inflate the inflatable seat belt in a very short time after actuation thereof by a sensing means, by introducing gas into the inflatable seat belt. For this purpose, sensing means 24 is provided which is electrically connected to and actuates inflating means 22 immediately upon sensing a preselected condition of the vehicle (e.g., as in a collision or upon rapid deceleration of the vehicle). Sensing means 24 is capable of sensing and actuating the inflating means before any substantial forward movement of the wearer as a result of the occurrence of the preselected condition. The sensing means may be any vehicle sensitive device which can sense and actuate the inflating means within a desired very short period of time after occurrence of such condition. As sensing means there may be provided any of the sensing devices which are suitable for use with an inflatable air bag restraint system, such as sensing devices of the inertia type and the crush type. Such sensing means are known in the art and thus are not more particularly described herein. Examples of suitable sensing devices are those shown in U.S. Pat. No. 3,668,063 to Bell. As stated above, such sensing means are responsive to a condition of the vehicle, most preferably a collision thereof, rather than being responsive to the movement of the wearer into the seat belt. As a result, the vehicle safety system thereof is capable of restraining the wearer prior to his moving with respect to his seat as a result of a collision.

The inflating means 22 includes a gas source which may be of the gas generating type (activated by means of a pyrotechnic device, for example) or stored gas type or a combination of both. As these gas sources also are known in the art, particularly with respect to proposed air bag restraint systems, they are not specifically described herein.

Inflating means 22 is connected to the interior of inflatable section 12 or is located interiorly thereof. When inflating means 22 is located outside inflatable section 12, the gas source may be provided with suitable tubing or the like to connect with the interior of inflatable section 12. When stored gas is used as the gas source, a valve or similar device may be provided to separate the gas source and connecting tubing. Such a valve would normally be closed but is opened upon actuation of inflating means 22 by sensing means 24. Valves may also be employed with hybrid gas sources (that is, a combination of stored and generated gas) or generated gas sources, as desired. When inflating means 22 is located outside of inflatable section 12, it is preferably connected to the retracting portion of the seat belt by means of suitable tubing or the like, which portion has connected thereto a tongue portion of a seat belt buckle. Alternatively, the inflating means may be connected to an inflatable section 12 which is fixed to the buckle portion. The gas source may be provided at any desired location within the vehicle, such as under a seat thereof, affixed to the floor, side portion or ceiling, etc.

In an alternate embodiment, inflating means 22 may be located interiorly of inflatable section 12. For example, a gas storage cartridge 26 may be provided in inflatable section 12, which cartridge is preferably filled with a pressurized gas and is electrically connected to sensing means 24. Such gas may comprise nitrogen, air, argon, etc. Cartridge 26 is adapted to release the contained gas into inflatable section 12 upon receipt of an electrical signal from sensor 24. For example, cartridge 26 may include a valve which is opened in response to an electrical signal from sensor 24 to release gas interiorly on the inflatable section to inflate the same.

Cartridge 26 may be held in place interiorly of inflatable belt section 12 by any suitable means, such as by stitching and is preferably located within a retracting section of the seat belt, more preferably adjacent to a tongue portion of a buckle assembly which is attached to the distal end of the retracting section. Of course, cartridge 26 may alternatively be located within a non-retracting seat belt section or within a seat belt section to which a buckle is attached.

In operation, inflatable seat belt 10, preferably both inflatable lap and shoulder belts, is secured about the body of the wearer. When a collision or other preselected condition of the vehicle occurs, sensing means 24 senses the same and immediately signals and actuates inflating means 22 which thereupon introduces a gas into inflatable sections 12 of the lap and shoulder belts. The force of the gas introduced into and expanding within inflatable section 12 is sufficient to break or rupture the fastening means (e.g., stitches 20) which normally holds inflatable section 12 in its uninflated state. Consequently, inflatable section 12 is inflated to a position shown by the dotted lines in the drawings. The pressure of the gas in the inflated tube may be in the order of about 5 to 15 psig, for example.

As inflatable section 12 is inflated, it expands radially to its enlarged diameter while at the same time it is contracting longitudinally. The longitudinal contraction occurs because a portion of the seat belt length is being expanded radially to form the inflated tube. This contraction acts against the wearer and presses him against the seat. The expanding force of the inflating seat belt also serves to press the wearer rearwardly into his seat. Since inflatable section 12 can be expanded in a very short period of time after a collision (e.g., on the order of about 5 to 15 milliseconds), inflatable sections 12 are inflated prior to any substantial forward motion of the wearer with respect to his seat. By the term "before any substantial forward motion of the wearer with respect to his seat" it is meant that the relative velocity between the wearer and his seat is zero or close to zero. That is, inflation occurs before the wearer is forced away from his seat or is only moved a short distance (e.g., a few inches) from his seat.

In this manner, the wearer is already snug against or pressed against the inflated seat belt and is being restrained thereby when the collision or deceleration forces act on him and move him forward in relation to his seat. Therefore, the wearer does not impact against the belt with any significant force and thus the chances of injury from such impact are reduced or eliminated. With the inflated seat belt bearing against the wearer, he can "ride down" the crash forces of a collision by utilizing the crush absorbing characteristics of the vehicle itself, with a considerable amount of his energy being absorbed by the gas within the seat belt.

As a result of inflation of inflatable sections 12 as described above, certain significant advantageous results are obtained which results are absent from prior art seat belt restraining devices known to the applicant. For example, prior art three-point seat belt systems of the non-inflating type are designed to have the seat belt webbing itself absorb impact of the wearer against the webbing. The force of the wearer impacting against such webbing, which usually has a width of about 2 inches, can be of considerable magnitude, for example, in the order of about 100 pounds per square inch (psi) with a 30 mile per hour (mph) collision. As a result, the seat belt, particularly the shoulder portion thereof, is forced against the wearer's body and injury may result. When utilizing the seat belt system of this invention, however, due to the fact that the wearer is under restraint by the inflated seat belt when he starts moving forward as a result of a collision, his impact against the inflated belt is much less, for example, in the order of 15 psi. Moreover, the impact of the wearer against the belt is cushioned by displacement of the gas trapped therein.

Additionally, due to the fact that the area of contact between the wearer and the restraining means (inflatable seat belt) is larger than in an uninflated seat belt, the area of protection is enlarged since the energy exerted upon the inflated belt is distributed over a wider area. Furthermore, the inflatable section in the shoulder harness adds further protection in that the wearer's chin is kept away from his chest by the inflated tube and thus injury resulting from impact between the chin and the chest can be eliminated or reduced. Head movement in the forward direction is thus significantly reduced.

Moreover, it has been found that the restraining force applied to the wearer before he moves forward eliminates the tendency present in prior seat belt systems of the shoulder belt to lift the lap belt up when the body slams against the shoulder belt and possibly injure the wearer. Moreover, the inflatable belts of this invention keep the wearer more upright in his seat during a collision and hence prevent him from "submarining" beneath the seat belts and away from their protective action.

An additional advantage of the inflatable seat belt system of this invention is that the rebound or "slingback" effect of the body, particularly the head, after it impacts against the belt is substantially minimized in relation to present uninflatable seat belt devices and thus further protection to the wearer is provided.

Besides the advantages enumerated above, the inflatable seat belt construction of this invention may be advantageously supplied in one size to fit all wearers.

In the event that inflatable section 12 fails to properly inflate, the uninflated seat belt itself acts as a backup system in restraining movement of the wearer. That is, the uninflated seat belt, which as described above may be formed from conventional seat belt fabric, itself acts as a conventional seat belt and thus limits the degree of forward movement of the wearer.

It can be seen that inflatable section 12 is sufficiently strong to provide the requisite restraint and cushioning effect without the necessity for internal strengthening means. However, if desired, a length of seat belt webbing of the flat type can be provided internally of inflatable section 12 to provide additional protection; obviously, other materials can be incorporated into inflatable section 12 to provide any needed additional strength.

In order to further describe the features of the present invention, the following non-limiting example is given.

EXAMPLE

Tests were conducted on a high $g$ or acceleration type test sled which simulates the effect of an automobile collision at a preselected velocity. The sled, which is mounted on rails, is provided with an automobile body of a chosen type. In the tests of this example, a standard Ford Motor Company body was employed. A human dummy placed on standard automotive seats within the body was strapped in the seats with a standard three point seat belt system (lap and shoulder belts) of present design (flat type) in one test and with the inflatable seat belt system of this invention in another test. The inflatable seat belt system utilized was a three-point system using a collapsed, tubular-shaped fabric of nylon filaments attached to conventional seat belt fabric on both ends, which in turn were connected to latches and buckles of conventional design. The inflatable section was folded into a W-fold and maintained in such configuration by means of stitching running longitudinally along the section. Gas cartridges, containing pressurized gas, were included inside the inflatable sections of the lap and seat belts. The pressurized gas was released from both cartridges within about 5 to 10 milliseconds after the simulated collision. All seat belt mountings, buckles, etc. were similar for both tests.

The dummy was chosen to represent a "50 percentile American male," that is, one which is of median weight and size. Devices were connected to sense and record the acceleration forces applied to the chest and head of the dummy in all three axes as a result of the simulated collision. Such acceleration forces were measured and added to compute the "resultant $g$'s," that is, the total force on each of the head and chest. The sled was catapulted to simulate a 30 mph crash in both tests.

With the standard lap and shoulder seat belts, the forces applied to the chest were about 68 resultant $g$'s and to the head about 160 resultant $g$'s. With the inflated lap and shoulder belts, the resultant chest forces were about 57 and the resultant head forces about 55 resultant $g$'s. It can be seen that the force applied to the dummy when provided with the inflatable seat belts of this invention were substantially less than those incident upon the dummy when provided with a standard non-inflatable lap and shoulder belt. From these tests, it can be seen that the possibility of injury to humans when the inflatable seat belt system of this invention is utilized would be lower than that with standard seat belt systems.

It should be apparent that the present invention is not limited to the particular embodiments described above and that modifications can be made thereto. For example, the seat belts can be employed without retractors or with automatically locking (e.g., inertia) retractors. It is desirable to include an inertia retractor, which normally takes up slack in the webbing, at least for the shoulder belt since such retractor would be actuated to its locked position as a result of a collision, thereby preventing further protraction of the webbing. In this manner, the webbing prior to its inflation is already adjacent the body of the wearer.

In another modification, a cover of textile or other material may be provided over the folded inflatable section in order to prevent accidental unfolding thereof and provide a more pleasing appearance. Moreover, a plurality of inflatable sections may be provided in a single seat belt to provide additional protection. Furthermore, a single inflatable seat belt may be provided which fits under the armpits of the wearer.

I claim:

1. A vehicle safety system comprising:
   a seat belt having an inflatable section thereof which is adapted to be positioned about a wearer when the wearer is seated in a seat in the vehicle, said inflatable section being in the form of a hollow tube normally longitudinally folded and maintained in an uninflated state,
   frangible fastening means normally maintaining said inflatable section in said uninflated state, said fastening means being breakable in response to inflation to permit unfolding of said inflatable section;
   sensing means responsive to a preselected condition of the vehicle;
   inflating means capable of inflating said inflatable section;
   electrical connecting means connecting said inflating means and said sensing means;
   said inflating means being responsive to actuation of said sensing means and capable of inflating said inflatable section prior to any substantial forward motion of the wearer relative to his seat as a result of said preselected condition; and
   said inflatable section upon inflation, expanding radially outward towards said wearer and contracting longitudinally, whereby said wearer is pressed rearwardly in his seat prior to any substantial forward motion.

2. A safety system in accordance with claim 1 wherein said inflating means is located at a position remote from said inflatable section.

3. A safety system in accordance with claim 1 wherein said frangible fastening means comprises stitching.

4. A safety system in accordance with claim 1 wherein said inflating means comprises a gas source which introduces gas into said inflatable section in response to actuation of said sensing means.

5. A safety system in accordance with claim 4 wherein said gas source comprises a stored gas, a generated gas, or a combination of stored and generated gas.

6. A safety system in accordance with claim 4 wherein said inflating means is located internally of said inflatable section.

7. A safety system in accordance with claim 1 wherein said seat belt includes lap and shoulder sections.

8. A safety system in accordance with claim 7 wherein said lap section and said shoulder sections each are provided with inflatable sections.

9. A safety system in accordance with claim 8 including means to secure said lap and shoulder sections to said vehicle, said means including a tongue and a buckle adapted to lockably cooperate therewith, said buckle being attached to said vehicle and said tongue being attached to said lap and shoulder sections.

10. A safety system in accordance with claim 7 wherein said lap section and said shoulder section are provided with a single inflatable section.

11. A safety system in accordance with claim 1 wherein said inflatable section is normally longitudinally folded in a "W" shape.

12. A safety system in accordance with claim 1 wherein said hollow tube is formed of seat belt webbing material.

13. A safety system in accordance with claim 1 wherein said inflating means is located outside said inflatable section and includes a source of stored gas adapted to be released into said inflatable section upon actuation of said inflating means.

14. A safety system in accordance with claim 1 wherein said sensing means is actuatable in response to a collision of said vehicle.

15. A safety system in accordance with claim 1 wherein said inflatable section is non-porous.

16. A safety system in accordance with claim 1 wherein said inflating means is located within said inflatable section.

* * * * *